United States Patent [19]

Yamane

[11] Patent Number: 5,177,557
[45] Date of Patent: Jan. 5, 1993

[54] METHOD FOR INSPECTING AXIS DISLOCATION OF MULTIFIBER CONNECTOR

[75] Inventor: Motohiro Yamane, Tokyo, Japan

[73] Assignee: The Furukawa Electric Co., Ltd., Tokyo, Japan

[21] Appl. No.: 790,638

[22] Filed: Nov. 8, 1991

[30] Foreign Application Priority Data

Nov. 13, 1990 [JP] Japan .................. 2-306624
Sep. 11, 1991 [JP] Japan .................. 3-231682

[51] Int. Cl.⁵ ............... G01N 21/88; G01B 11/27
[52] U.S. Cl. ................. 356/73.1; 356/394; 356/239
[58] Field of Search ............ 356/73.1, 239, 394, 356/121

[56] References Cited

U.S. PATENT DOCUMENTS 5,090,802  2/1992  Longhurst ............... 356/73.1

*Primary Examiner*—Vincent P. McGraw
*Attorney, Agent, or Firm*—Frishauf, Holtz, Goodman & Woodward

[57] ABSTRACT

A method for inspecting axis dislocation of a multifiber connector provided with a plurality of fiber insertion holes into which optical fibers are inserted for inspecting axis dislocation of each of the fiber insertion holes based on an inspection light irradiated from a light source. A reference connector to be a reference in inspection and a sample connector to be inspected are positioned at predetermined positions, the inspection light irradiated from each of the fiber insertion holes is irradiated to a position detection sensor through an optical system, the position of the inspection light is detected on the light receiving surface of the position detection sensor, and then, an amount of axis dislocation of each of the fiber insertion holes of the sample connector corresponding to each of the fiber insertion holes of the reference connector is inspected based on the detected position of each of the fiber insertion holes.

19 Claims, 7 Drawing Sheets

METHOD FOR INSPECTING AXIS DISLOCATION OF MULTIFIBER CONNECTOR

BACKGROUND OF THE INVENTION

1. Field of the Invention

The present invention relates to a method for inspecting axis dislocation of a multifiber connector for inspecting axis dislocation of optical fibers attached to the multifiber connector.

2. Description of Related Arts

A multifiber connector is butt jointed with the other multifiber connector by engaging its guide pin with a pin hole of the other connector and it is constituted by a plurality of optical fibers, for example, tape fibers inserted into a ferrule made of plastic and fixed by an adhesive. On the above ferrule, fiber holes into which the plurality of optical fibers are inserted are precisely formed with a predetermined pitch.

However, when the accuracy in forming these holes is poor, axes of the optical fibers to be butted are dislocated in butt joint with the other multifiber connector, which would cause joint loss and prevent stable optical communication.

Thus, as for the multifiber connector, it is necessary to inspect dislocation of axis of each of the optical fibers by temporarily fitting or bonding the optical fibers for quality control purpose after manufacture of the ferrule.

As a method for such inspection, there is a method to inspect axis dislocation of each of the optical fibers by analyzing an image of an inspection light at a connector end surface transmitted through each of the optical fibers using an image processing technique. Also there is a method to inspect axis dislocation of each of the optical fibers in a multifiber connector by butt jointing multifiber connectors with each other, then measuring joint loss.

However, in using the image processing technique, there has been a problem that an expensive optical stage on which the multifiber connector to be measured can be positioned with accuracy on a plane is needed and the time required for measurement is long.

In the meantime, in measuring the joint loss, there has been a problem that axis dislocation can not be quantitatively grasped as the position of each of the optical fibers is not measured.

SUMMARY OF THE INVENTION

The present invention has been made in view of the aforesaid drawbacks. It is an object of the present invention to provide a method for inspecting axis dislocation of optical fibers in a multifiber connector inexpensively and rapidly with high accuracy.

To achieve the above object, there is provided in accordance with the present invention of a method for inspecting axis dislocation of a multifiber connector a method constituted by positioning a reference connector to be a reference in inspection and a sample connector to be inspected at predetermined positions, irradiating an inspection light irradiated from each of fiber insertion holes to a position detection sensor, detecting the position of the inspection light on a light receiving surface of the above position detection sensor and then, by inspecting an amount of axis dislocation of each of the fiber insertion holes of the above sample connector corresponding to each of the fiber insertion holes of the above reference connector based on the positions of each of the above detected fiber holes.

The position detection sensor can be of any type as long as it can quantitatively detect the position of the inspection light irradiated from the optical fibers held by each connector on the light receiving surface of the detection sensor, and, for example, PSD (Position Sensing Device) or a quadrant photodiode can be used as the sensor.

In the method of the present invention, the inspection light irradiated from each connector positioned in turn at the predetermined position is introduced to the position detection sensor through an optical system.

The position detection sensor detects the position of the inspection light which was irradiated from either the optical fiber of each connector or the fiber insertion hole and has reached as above on the light receiving surface of the position detection sensor.

Based on the detected positions of these inspection lights, an amount of axis dislocation of each of the fiber insertion holes or each of the optical fibers inserted into the above fiber insertion holes of the sample connector corresponding to each of the fiber insertion holes or each of the optical fibers inserted into the above fiber insertion holes of the reference connector is acquired.

Thus, according to the method for inspecting axis dislocation of a multifiber connector of the present invention, the axis dislocation of the optical fibers of the multifiber connector can be inspected by a simple optical system inexpensively and rapidly with high accuracy.

The above and other objectives, characteristics and advantages of the present invention will be made more clear from the following detailed description based on the accompanying drawings.

DETAILED DESCRIPTION OF THE PREFERRED EMBODIMENTS

Embodiment 1

A first embodiment of the present invention will be described in detail referring to FIG. 1 to FIG. 7.

Figure 1:
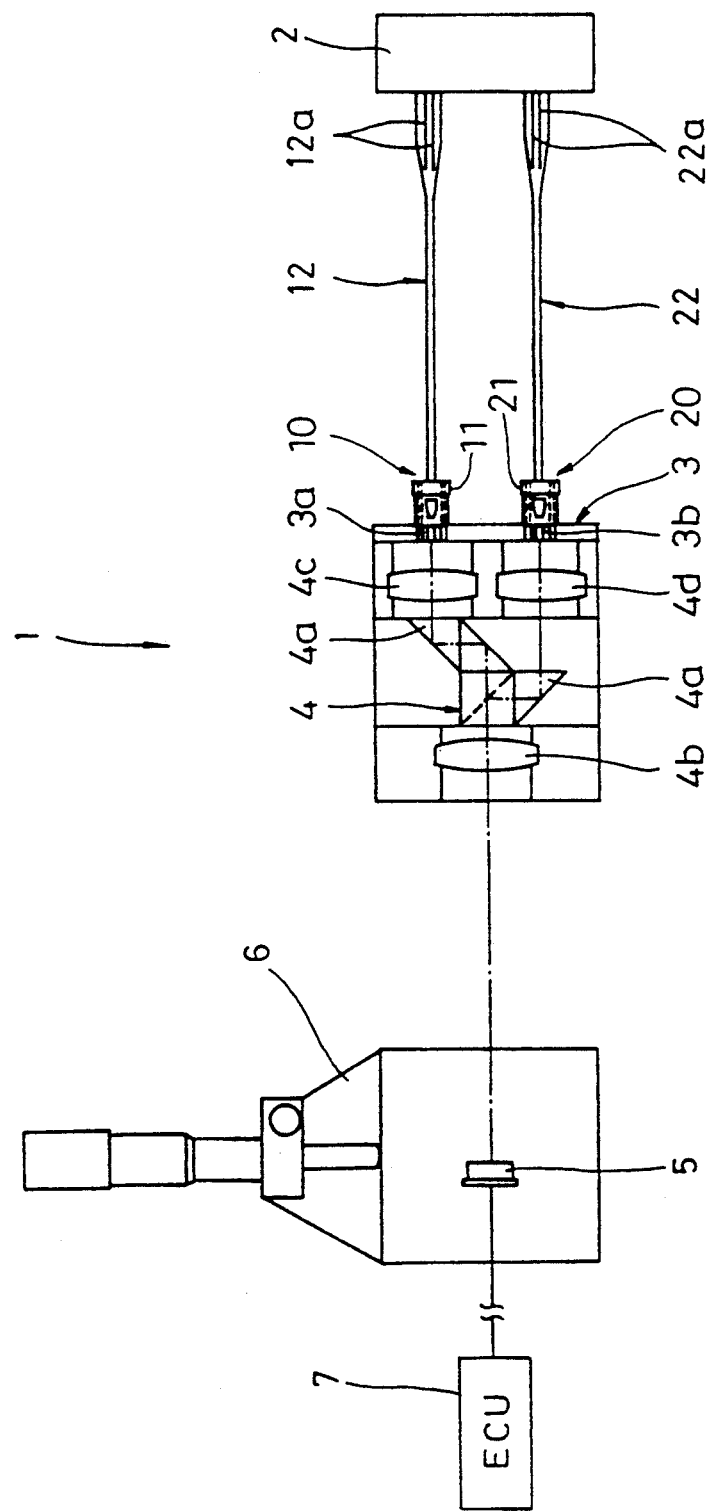
FIG. 1 is plan view showing a schematic constitution of an axis dislocation inspection system used for the present invention and explains the first preferred embodiment of the axis dislocation inspection method of a multifiber connector according to the present invention.

FIG. 1 is a schematic constitutional view of an axis dislocation inspection system for carrying out the method of the present invention, and an axis dislocation inspection system 1 is provided with a light source 2, a connector fitting member 3, an optical system 4, a position detection sensor (hereinafter referred to merely as "PSD") 5, a movable stage 6 and an electronic control unit (hereinafter refered to as "ECU") 7.

Here, as the light source 2, those with a uniform and stable characteristic is used so that the strength distribution of the inspection light irradiated from a reference connector 10 and a sample connector 20, which will be described later, becomes even.

The connector fitting member 3 is provided with fitting parts 3a and 3b with a predetermined interval for removably fitting the reference connector 10 and the sample connector 20, and on each of the fitting parts 3a and 3b, two streaks of V grooves 3c and 3c (see FIG. 3) for positioning each of the connectors 10 and 20 at predetermined positions are formed respectively.

Here, as the reference connector 10 and the sample connector 20 have the same constitution, only the reference connector 10 will be described, while corresponding symbols will be given to the corresponding parts of the other sample connector 20 in the following description and the drawings for briefness.

Figure 2:
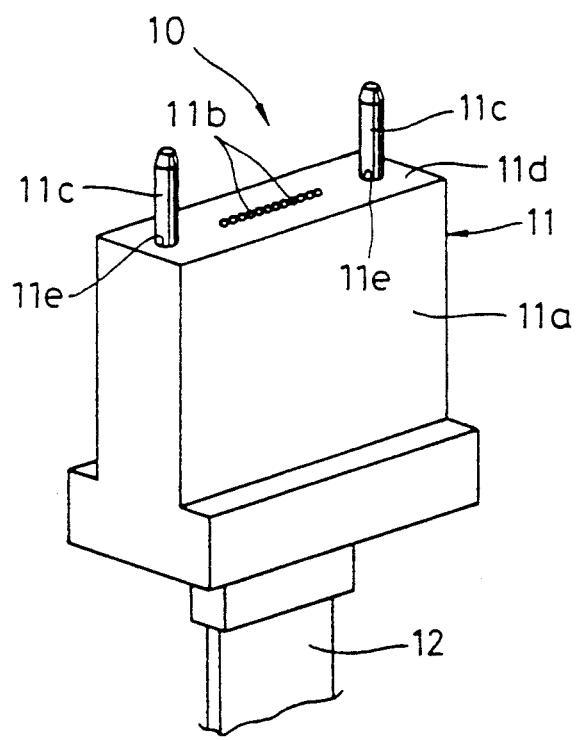
FIG. 2 is a perspective view of a multifiber connector.

The reference connector 10 is, as shown in FIG. 2, constituted by attaching a multifiber 12 to a ferrule 11.

In the ferrule 11, a plurality of fiber insertion holes 11b are formed on a body 11a and two guide pins 11c are attached to pin holes 11e on both sides of these fiber insertion holes 11b.

The multifiber 12 is a tape fiber in which a plurality of optical fibers 12a are covered with a synthetic resin, and attached to the ferrule 11 by removing one end of the covering and separating optical fibers 12a with each other (see FIG. 3) and by inserting each of the optical fibers 12a into the fiber insertion holes 11b and fixing them by an adhesive, while the other end is optically connected to the light source 2.

Figure 3:
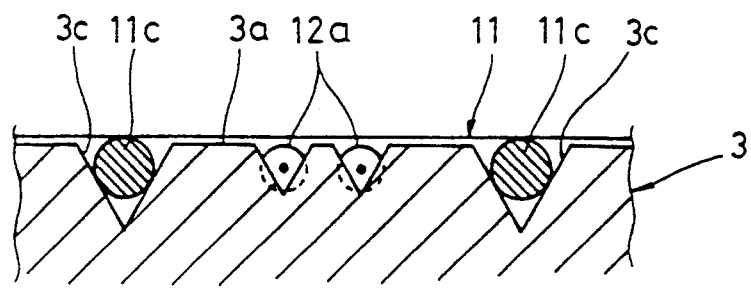
FIG. 3 is a cross sectional view of an essential part showing a positioning state of a multifiber connector to a connector fitting member.

As for the reference connector 10, a butt joint end surface lid of the ferrule 11 has been polished together with the end surfaces of the plurality of optical fibers 12a through micro-lapping or the like. And the reference connector 10 is fitted to the connector fitting member 3 by positioning the guide pins 11c and 11c by the two streaks of V grooves 3c formed on the fitting part 3a as shown in FIG. 3.

The optical system 4 has a plurality of prisms 4a and imaging lenses 4b to 4d as shown in FIG. 1, and an image is formed on the PSD 5 by harmonizing an optical path of the inspection light from the light source 2 irradiated from each of the connectors 10a and 20 as shown by a dashed line in the drawing.

The PSD 5 is a semi-conductor device for detecting the position of an optical spot utilizing a silicon photodiode and quantitatively detects the spot position of the inspection light irradiated on the light receiving surface of the sensor.

The movable stage 6 moves the PSD 5 in the biaxial direction within the horizontal plane orthogonal to the optical axis and adjusts the position of the PSD 5 so that the inspection light irradiated from the optical system 4 is received at the center of the light receiving surface.

The ECU 7 stores the position of each of the outgoing lights detected by the PSD 5 and calculates an amount of axis dislocation of each of the optical fibers 12a and 22a of the reference connector 10 and the sample connector 20 based on these positions.

According to the present invention, axis dislocation of each of the optical fibers 12a and 22a is inspected as follows in fitting, for example, the multifibers 12 and 22 with four optical fibers to each of the connectors 10 and 20 using the axis dislocation inspection system 1.

First, the reference connector 10 is fitted to the fitting part 3a of the connector fitting member 3 while positioning the guide pins 11c and 11c by the V grooves 3c and 3c.

Then, the inspection light is irradiated from the light source 2 to the first optical fiber 12a of the multifiber 12. Then, this inspection light forms an image on the PSD 5 through the optical system 4 and its spot position is detected.

Next, the spot position of the inspection light detected by the PSD 5 is stored in the ECU 7 as a coordinate value based on the X and the Y axes which have been set in advance. The value at this time is made as, for example, ($PX_{M1}$, $PY_{M1}$).

And the inspection light is similarly irradiated in turn to the second through the fourth optical fibers 12a, and the spot positions ($PX_{M2}$, $PY_{M2}$), ($PX_{M3}$, $PY_{M3}$) and ($PX_{M4}$, $PY_{M4}$) of the inspection lights detected by the PSD 5 are stored in the ECU 7.

And then, the reference connector 10 is switched to the fitting part 3b of the connector fitting member 3 with positioning it by the guide pins 11c and 11c, and the same operation is repeated for each of the optical fibers 12a of the multifiber 12. Thus, the spot positions ($PX_{N1}$, $PY_{N1}$), ($PX_{N2}$, $PY_{N2}$), ($PX_{N3}$, $PY_{N3}$) and ($PX_{N4}$, $PY_{N4}$) of the inspection lights detected by the PSD 5 are stored in turn in the ECU 7.

At this time, as the light receiving area of the PSD 5 is small, the movable stage 6 is moved in the biaxial direction within the horizontal plane by a predetermined amount each time the optical fiber 12a to be inspected is switched, and the spot position of the inspection light irradiated on the PSD 5 is adjusted so that it is positioned almost at the center of the light receiving surface.

From each of the spot positions obtained above, the value relating to $\Delta PX$ and $\Delta PY$ expressed by the following equation is acquired at the ECU 7 and stored.

$$\Delta PX_1 = PX_{N1} - PX_{M1}, \Delta PX_2 = PX_{N2} - PX_{M2}$$

$$\Delta PX_3 = PX_{N3} - PX_{M3}, \Delta PX_4 = PX_{N4} - PX_{M4}$$

$$\Delta PY_1 = PY_{N1} - PY_{M1}, \Delta PY_2 = PY_{N2} - PY_{M2}$$

$$\Delta PY_3 = PY_{N3} - PY_{M3}, \Delta PY_4 = PY_{N4} - PY_{M4}$$

Here, the optical system 4 is originally adjusted so that the inspection lights from the multifiber connector fitted to each of the fitting parts 3a and 3b pass the same optical path by the plurality of prisms 4a and the imaging lenses 4b to 4d. However, slight dislocation of optical axis can occur even in such a case.

Therefore, the $\Delta PX_1$ to $\Delta PX_4$ and $\Delta PY_1$ to $\Delta PY_4$ expressed by the above equation represents an amount of axis dislocation in the optical system 4 itself.

Also, when the number of optical fibers of the multifiber 12 differs, for example, the number of optical fibers is n, the spot positions at the fitting part 3a and the fitting part 3b are $(PX_{M_n}, PY_{M_n})$ and $(PX_{N_n}, PY_{N_n})$, respectively, and the equation on the above $\Delta PX$ and $\Delta PY$ becomes as follows:

$$\Delta PX_n = PX_{Nn} - PX_{Mn}, \Delta PY_n = PY_{Nn} - PY_{Mn}$$

Next, measurement of the sample connector 20 in which the multifiber 22 is fitted to the ferrule 21 is started. At this time, the reference connector 10 is fitted to the fitting part 3a, the sample connector 20 at the fitting part 3b, respectively by positioning each by the guide pins 11c and 11c, and the guide pins 21c and 21c.

And same as above, the inspection light transmitted through each of the optical fibers 12a and 22a is detected in turn by the PSD 5, and the spot position of each of the inspection lights is acquired and stored at the ECU 7.

Here, the spot position of the first optical fiber 12a of the reference connector 10 and the spot position of the first optical fiber 22a of the sample connector 20 are expressed as, for example, $(X_{M1}, Y_{M1})$ and $(X_{N1}, Y_{N1})$ as above.

And the relative amount of axis dislocation $\Delta X1$ and $\Delta Y1$ of the first optical fiber 22a to the first optical fiber 12a on the X and the Y axes are calculated respectively at the ECU 7 using the following equation:

$$\Delta X_1 = (X_{N1} - X_{M1}) - \Delta PX_1$$

$$\Delta Y_1 = (Y_{N1} - Y_{M1}) - \Delta PY_1$$

As for the other optical fibers, the relative axis dislocation amounts $\Delta X_2$, $\Delta X_3$ and $\Delta X_4$, and $\Delta Y_2$, $\Delta Y_3$ and $\Delta Y_4$ are calculated at the ECU 7.

Thus, the relative axis dislocation amount of each of the optical fibers 22a to the corresponding optical fibers 11a can be measured by a simple inspection without using an expensive instrument such as an optical stage and so on.

In the above inspection method, the measurement accuracy in the axis dislocation inspection of the optical fibers was in the sub micron order of about 0.2 μm when a quadrant photodiode is used as the position detection sensor.

Also, the method according to the present invention can be carried out for the sample connector 20 even in the state of temporary fitting that the multifiber 22 is not bonded to the ferrule 21.

Figure 4:
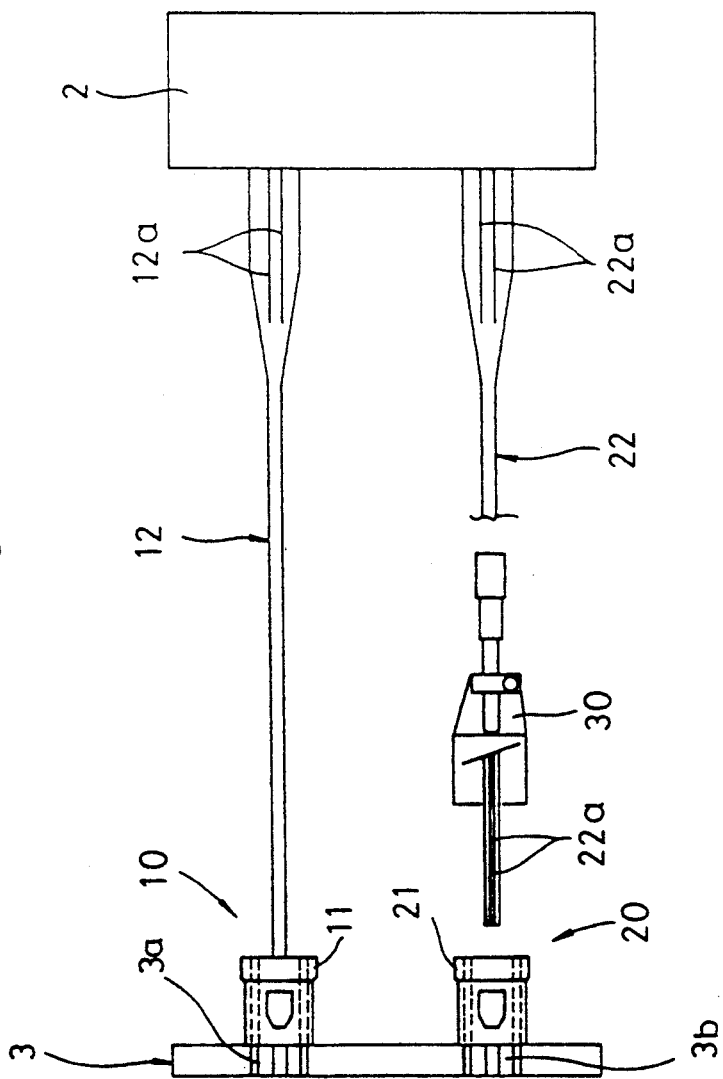
FIG. 4 is a plan view showing a schematic constitution of an axis dislocation inspection system and explains a variation of the first preferred embodiment.
Figure 5:
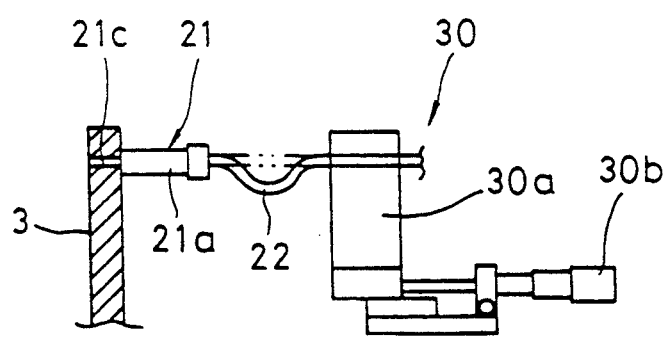
FIG. 5 is a side view showing with a cross section of a connector fitting member and illustrates an insertion stage for inserting optical fibers into a ferrule in a variation of the first preferred embodiment.

In such a case, as shown in FIGS. 4 and 5, an insertion stage 30 for inserting the multifiber 22 to the ferrule 21 of the sample connector 20 is added to the above axis dislocation inspection system 1. In FIGS. 4 and 5, the optical system 4, the PSD 5, the movable stage 6 and the ECU 7 are not shown.

The insertion stage 30 is, as shown in FIG. 5, to insert each of the optical fibers 22a into the fiber insertion holes 21b of the ferrule 21 with guiding a holding block 30a for holding the multifiber 22 by a V groove (not shown) through, for example, advancing it by a drive cylinder 30b, and provided in the neighborhood of the fitting part 3b of the connector fitting member 3.

And the ferrule 11 of the reference connector 10 is first fitted to the fitting part 3a so as to optically connect the light source 2 to the optical system 4.

Next, the sample connector 20 to which the multifiber 22 is not fitted yet is positioned by the guide pins 21c and 21c of the ferrule 21, and only the ferrule 21 is fitted to the fitting part 3b.

Then, one end of the multifiber 22 which has been mirror-cut and separated to each of the optical fibers 22a is fitted to the holding block 30a of the insertion stage 30. Here, the other end of the multifiber 22 is connected to the light source 2 in advance.

Next, the insertion stage 30 is operated so as to collectively insert the plurality of optical fibers 22a into each of the corresponding fiber insertion holes 21b of the ferrule 21, and the end surface of each of the optical fibers 22a is positioned at a butt end surface 21d.

Thus, in the state that the multifiber 22 is temporarily fitted to the ferrule 21, axis dislocation of each of the optical fibers 12a and 22a held by each of the connectors 11 and 21 is inspected as mentioned above.

When the multifiber 22 is inspected in the temporary fitted state as above, axis dislocation can be inspected only by exchanging the sample connector 20 with leaving the reference connector 10 and the multifiber 22 as they are, and inspection can be automated.

Moreover, in the ferrule 21 of the inspected sample connector 20, when the axis dislocation amount is too large to be used as a product, only the ferrule 21 may be rejected. Therefore, loss in the manufacture can be reduced compared with the case that the multifiber 22 is bonded to the ferrule 21.

When the axis dislocation inspection is automated as above, accidents such as bending damage of the optical fiber 22a can occur in insertion into the sample connector 20. In such a case, the inspection light transmitted through the optical fiber 22a with which an insertion accident occurred hardly reach the PSD 5.

Therefore, as the light receiving amount at the PSD 5 becomes zero in such a case, it may be so constituted that occurrence of an insertion accident is judged at the ECU 7 by the light receiving amount and the above measurement is carried out only when it is judged that such an accident has not occurred.

Moreover, under the method according to the present invention, axis dislocation inspection can be carried out by directly measuring the position of the fiber insertion hole instead of temporarily fitting the multifibers 12 and 22 to the reference connector 10 and the sample connector 20.

Figure 6:
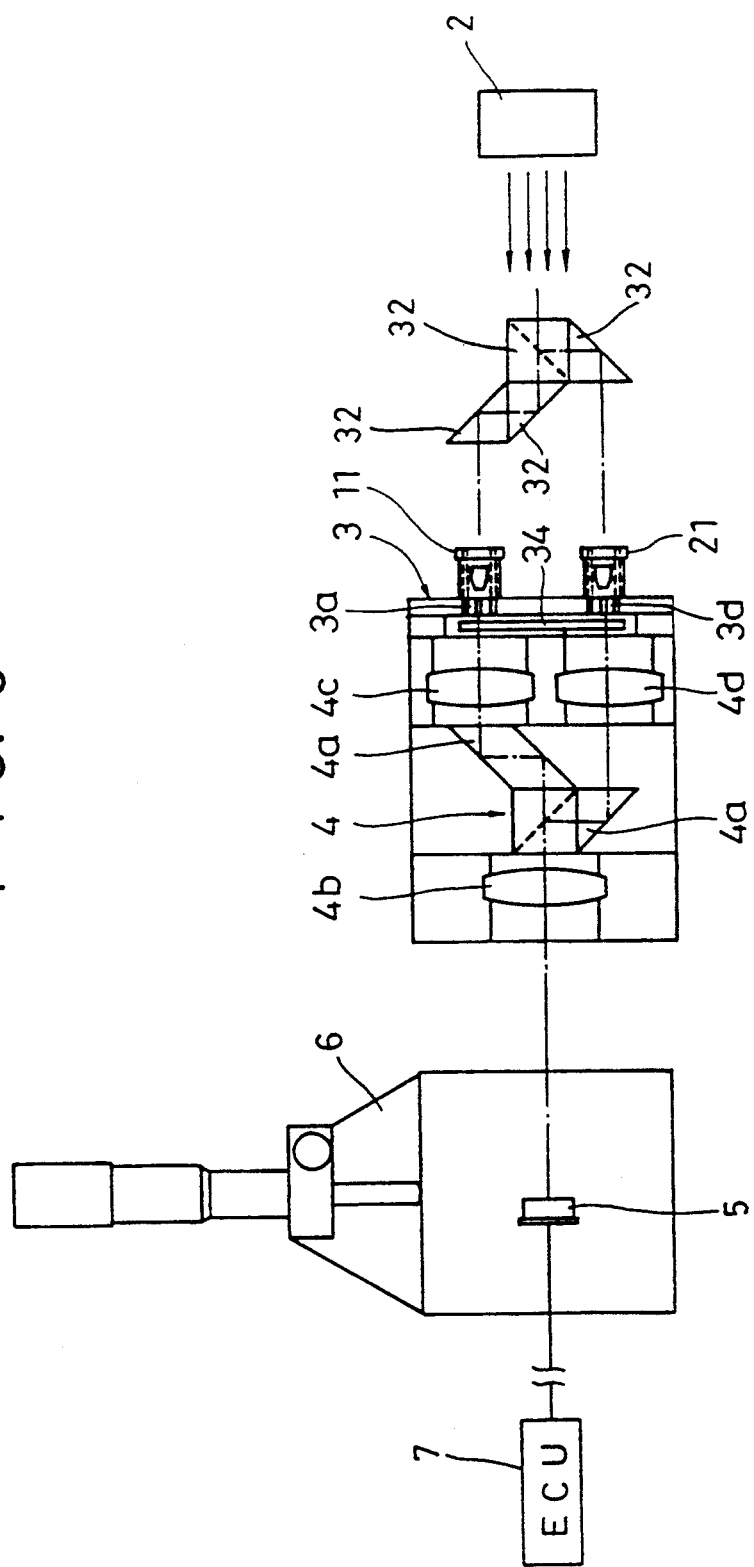
FIG. 6 is a plan view showing a schematic constitution of an axis dislocation inspection system and explains another variation of the first preferred embodiment.
Figure 7:
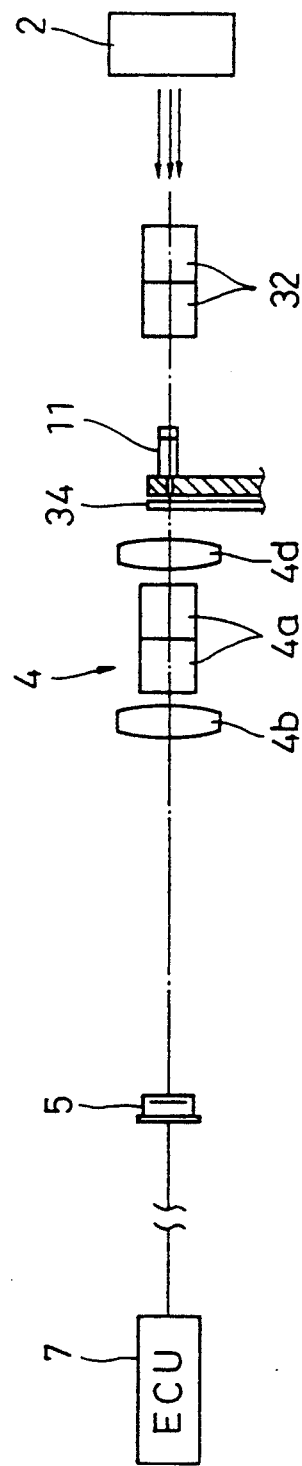
FIG. 7 is a side view of an essential part with a cross section of a connector fitting member in FIG. 6.

In such a case, for example, as shown in FIGS. 6 and 7, the optical system 4 for separating the inspection light from the light source 2 to two ways by a plurality of prisms 32 as shown by a dashed line and for irradiating them to the fiber insertion holes 11b and 21b of the reference connector 10 and the sample connector 20, respectively, is used.

Also, it is set so that the inspection light from the light source 2 irradiates in turn from the reference connector 10 or the sample connector 20 to the PSD 5 by switching a screen plate 34 arranged between the connector fitting member 3 and the optical system 4.

Thus, when axis dislocation of the inspected ferrule 21 is too large as mentioned above, only the defective ferrule 21 may be rejected, and in addition, it gives rise to another advantage that an unstable element of the light source 2 can be eliminated by separating the inspection light to the two ways and using the same light source.

Embodiment 2

Next, the second embodiment of the present invention will be described in detail referring to FIG. 8. In the following description, the parts corresponding to the constitutional elements in the above-mentioned first embodiment are given the same symbols in the drawings for briefness.

Figure 8:
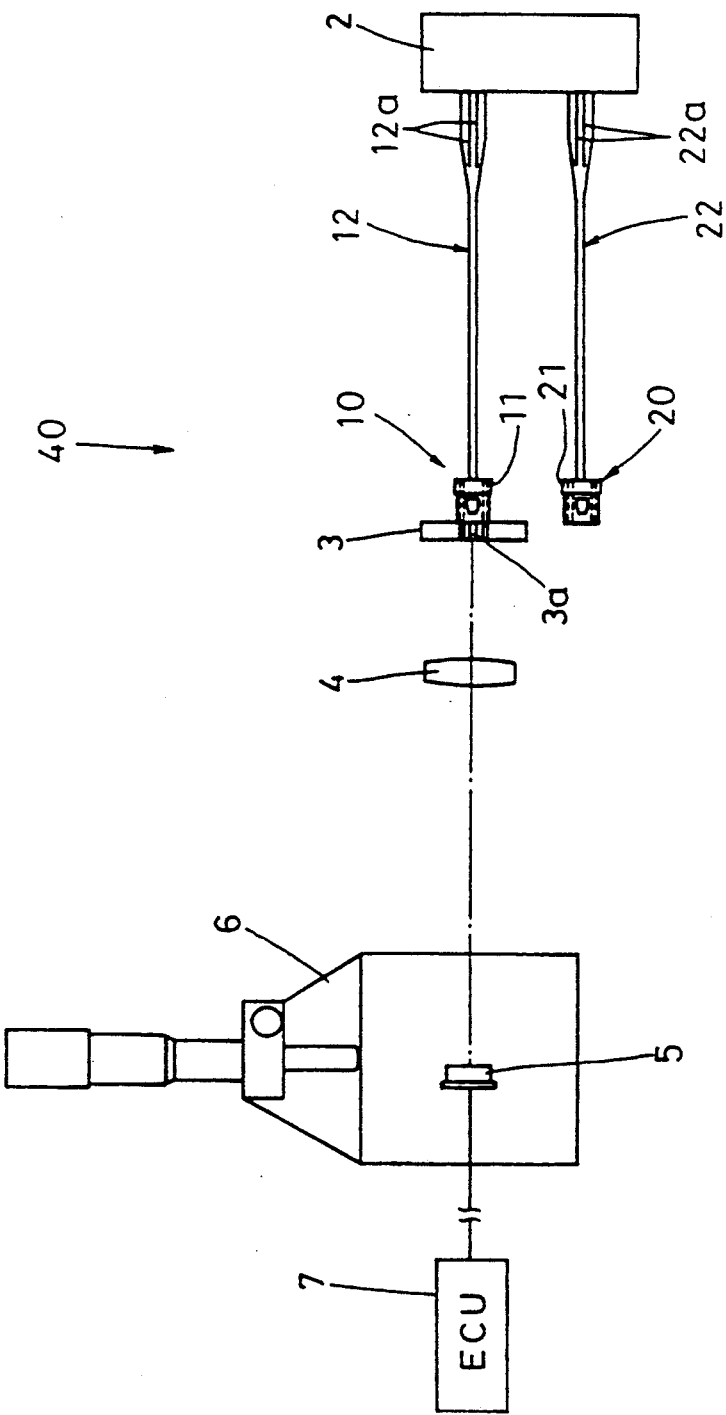
FIG. 8 is a plan view showing a schematic constitution of an axis dislocation inspection system and explains the second preferred embodiment of the axis dislocation inspection method of a multifiber connector according to the present invention.

FIG. 8 is a schematic constitutional view of the axis dislocation inspection system, and an axis dislocation inspection system 40 is provided with the light source 2, the connector fitting member 3, the imaging lens (optical system) 4, the PSD 5, the movable stage 6 for moving the PSD 5 in the horizontal direction orthogonal to the optical path, and the ECU 7 for storing positions of each of the outgoing lights detected by the PSD 5 and for calculating an axis dislocation amount.

The connector fitting member 3, as shown in FIG. 8, is provided with the fitting part 3a for removably fitting the reference connector 10 and the sample connector 20, and on the fitting part 3a, the V groove 3c (see FIG. 3) for positioning each of the connectors 10 and 20 is formed.

Here, an image is formed by the imaging lens 4 on the PSD 5 of the inspection light from the light source 2 irradiated from the reference connector 10 or the sample connector 20 as shown in FIG. 8.

According to the present embodiment, axis dislocation of the sample connector to the reference connector 10 in fitting the multifibers with four optical fibers 12 and 22 to each of the connectors 10 and 20 is inspected as follows using the above axis dislocation inspection system 40.

First, the reference connector 10 is fitted to the fitting part 3a of the connector fitting member 3 by fixing the guide pins 11c and 11c to the V grooves 3c and 3c.

Next, the inspection light is irradiated to the first optical fiber 12a of the multifiber 21. Then, this inspection light passes the imaging lens 4 and forms an image on the PSD 5, and its spot position is detected.

Next, the spot position of the inspection light detected by the PSD 5 is stored in the ECU 7 as a coordinate value based on the X and the Y axes which have been set in advance. This value is made as, for example, $(X_{M1}, Y_{M1})$.

Then, the reference connector 10 is removed from the fitting part 3a of the connector fitting member 3, and the sample connector 20 is fitted to the fitting part 3a.

And then, the inspection light is irradiated to the first optical fiber 22a of the multifiber 22, and the spot position of the inspection light detected by the PSD 5 $(X_{N1}, Y_{N1})$ is stored in the ECU 7. During this period, the movable stage 6 is kept fixed and not moved in the horizontal direction.

And the relative amounts of axis dislocation $\Delta X_1$ and $\Delta Y_1$ of the first optical fiber 22a to the first optical fiber 12a on the X and the Y axes are calculated by the ECU 7 using the following equation:

$$\Delta X_1 = X_{N1} - X_{M1}, \Delta Y_1 = Y_{N1} - Y_{M1}$$

And as for the other optical fibers, relative axis dislocation amounts $\Delta X_2$, $\Delta X_3$ and $\Delta X_4$, and $\Delta Y_2$, $\Delta Y_3$ and $\Delta Y_4$ are similarly calculated by the ECU 7.

At this time, as the light receiving area of the PSD 5 is generally small and the inspection lights from the first optical fiber to the fourth optical fiber can not be received at the same time, the movable stage 6 is moved by a predetermined amount each time the optical fiber to be inspected is switched, and the spot position of the inspection light is adjusted so that it is positioned almost at the center of the light receiving surface.

Thus, the relative axis dislocation amount of each of the optical fibers 22a to the corresponding optical fibers 12a can be measured by a simple inspection without using an expensive instrument such as an optical stage and so on.

In the above inspection method, the measurement accuracy in the axis dislocation inspection of the optical fibers was in the sub micron order of less than 0.2 μm when a position sending device is used as the position detection sensor.

Also, as with the first embodiment, this preferred embodiment can be carried out for the sample connector 20 in the state of temporary fitting that the multifiber 22 is not bonded to the ferrule 21. In this case, in the ferrule 21 of the inspected sample connector 20, when the axis dislocation amount of the fiber insertion hole 21b is too large to be used as a product, only the ferrule 21 may be rejected, and loss in the manufacture can be reduced compared with the case that the multifiber 22 is bonded.

Moreover, according to this preferred embodiment, the axis dislocation inspection can be carried out by directly measuring the positions of the fiber insertion holes 11b and 21b instead of temporarily fitting the multifibers 12 and 22 to the reference connector 10 and the sample connector 20. In this case, there is an advantage as above that only the defective ferrule 21 may be rejected when axis dislocation of the inspected ferrule 21 is large.

What is claimed is:

1. A method for inspecting axis dislocation of a multifiber connector provided with a plurality of fiber insertion holes into which optical fibers are inserted for inspecting axis dislocation of each of said fiber insertion holes based on an inspection light irradiated from a light source comprising:

positioning a reference connector to be a reference in inspection and a sample connector to be inspected at predetermined positions;

irradiating the inspection light irradiated from each of said fiber insertion holes to a position detection sensor through an optical system and detecting the position of the inspection light on a light receiving surface of said position detection sensor; and inspecting an amount of axis dislocation of each of the fiber insertion holes of said sample connector corresponding to each of the fiber insertion holes of said reference connector based on the position of each of said detected fiber holes.

2. A method for inspecting axis dislocation of a multifiber connecter in claim 1, wherein said reference connector is switched and fitted in turn to each of fitting parts of a positioning member having a first fitting part and a second fitting part, axis dislocation of said optical system itself is measured based on an inspection light irradiated from each of said fiber insertion holes, and then, the reference connector is fitted to said first fitting part and the sample connector to said second fitting part, respectively, and an amount of axis dislocation of each of the fiber insertion holes of said sample connector corresponding to each of the fiber insertion holes of said reference connector is inspected based on the inspection light irradiated from each of the fiber insertion holes of each of the connectors.

3. A method for inspecting axis dislocation of a multifiber connector in claim 1, wherein said reference connector and sample connector are alternately fitted to a positioning member having a single fitting part, and an amount of axis dislocation of each of the fiber insertion holes of said sample connector corresponding to each of the fiber insertion holes of said reference connector is inspected based on an inspection light irradiated from each of the fiber insertion holes of both the connectors.

4. A method for inspecting axis dislocation of a multifiber connector in claim 2, wherein each of said reference connector and sample connector has guide pin holes for inserting guide pins, respectively, and positions the guide pins in V grooves formed at each of said fitting parts, whereby is fitted to said positioning member.

5. A method for inspecting axis dislocation of a multifiber connector in claim 3, wherein each of said reference connector and sample connector has guide pin holes for inserting guide pins, respectively, and positions the guide pins in V grooves formed at said fitting part, whereby is fitted to said positioning member.

6. A method for inspecting axis dislocation of a multifiber connector in claim 1, wherein each of said fiber insertion holes is detected based on an inspection light irradiated from each of optical fibers inserted into each of said fiber insertion holes and bonded.

7. A method for inspecting axis dislocation of a multifiber connector in claim 2, wherein each of said fiber insertion holes is detected based on an inspection light irradiated from each of optical fibers inserted into each of said fiber insertion holes and bonded.

8. A method for inspecting axis dislocation of a multifiber connector in claim 3, wherein each of said fiber insertion holes is detected based on an inspection light irradiated from each of optical fibers inserted into each of said fiber insertion holes and bonded.

9. A method for inspecting axis dislocation of a multifiber connector in claim 1, wherein each of said fiber insertion holes is detected based on an inspection light irradiated from each of optical fibers removably inserted into each of said fiber insertion holes.

10. A method for inspecting axis dislocation of a multifiber connector in claim 2, wherein each of said fiber insertion holes is detected based on an inspection light irradiated from each of optical fibers removably inserted into each of said fiber insertion holes.

11. A method for inspecting axis dislocation of a multifiber connector in claim 3, wherein each of said fiber insertion holes is detected based on an inspection light irradiated from each of optical fibers removably inserted into each of said fiber insertion holes.

12. A method for inspecting axis dislocation of a multifiber connector in claim 1, wherein each of said fiber insertion holes is detected based on an inspection light directly irradiated from each of said fiber insertion holes.

13. A method for inspecting axis dislocation of a multifiber connector in claim 2, wherein each of said fiber insertion holes is detected based on an inspection light directly irradiated from each of said fiber insertion holes.

14. A method for inspecting axis dislocation of a multifiber connector in claim 3, wherein each of said fiber insertion holes is detected based on an inspection light directly irradiated from each of said fiber insertion holes.

15. A method for inspecting axis dislocation of a multifiber connector in claim 1, wherein said optical system has at least one lens.

16. A method for inspecting axis dislocation of a multifiber connector in claim 1, wherein said optical system has a plurality of prisms and at least one lens.

17. A method for inspecting axis dislocation of a multifiber connector in claim 1, wherein said position detection sensor is a position sensing device.

18. A method for inspecting axis dislocation of a multifiber connector in claim 1, wherein said position detection sensor is a quadrant photodiode.

19. A method for inspecting axis dislocation of a multifiber connector in claim 1, wherein said position detection sensor is installed on a driving means which is movable in a direction of at least one axis orthogonal to the optical axis of an inspection light.

* * * * *